(12) United States Patent
Samie et al.

(10) Patent No.: US 10,267,376 B2
(45) Date of Patent: Apr. 23, 2019

(54) POWERTRAIN TORQUE TRANSFER DAMPING MECHANISM

(71) Applicant: GM GLOBAL TECHNOLOGY OPERATIONS LLC, Detroit, MI (US)

(72) Inventors: Farzad Samie, Franklin, MI (US); Derek F. Lahr, Howell, MI (US); Dmitriy Bruder, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 55 days.

(21) Appl. No.: 15/198,239

(22) Filed: Jun. 30, 2016

(65) Prior Publication Data

US 2018/0003262 A1 Jan. 4, 2018

(51) Int. Cl.
| | |
|---|---|
| *F16F 15/121* | (2006.01) |
| *F16F 15/123* | (2006.01) |
| *F16H 25/18* | (2006.01) |
| *F16D 3/12* | (2006.01) |
| *F16D 3/56* | (2006.01) |
| *F16H 41/24* | (2006.01) |
| *F16H 45/02* | (2006.01) |

(52) U.S. Cl.
CPC .......... *F16F 15/1213* (2013.01); *F16D 3/12* (2013.01); *F16D 3/56* (2013.01); *F16F 15/123* (2013.01); *F16F 15/1236* (2013.01); *F16H 25/18* (2013.01); *F16H 41/24* (2013.01); *F16H 2045/0221* (2013.01)

(58) Field of Classification Search
CPC .... F16F 15/121; F16F 15/1213; F16F 15/123; F16F 15/1333; F16F 15/1421; F16H 25/18

USPC ................................................ 464/57–59, 77
See application file for complete search history.

(56) References Cited

U.S. PATENT DOCUMENTS

| | | | | |
|---|---|---|---|---|
| 769,594 | A | * | 9/1904 | Dould ...................... B62M 3/00 464/59 |
| 4,690,256 | A | * | 9/1987 | Bopp .................. F16F 15/1213 464/57 |
| 4,768,637 | A | * | 9/1988 | Bopp .................. F16F 15/1213 464/57 |

(Continued)

FOREIGN PATENT DOCUMENTS

| | | |
|---|---|---|
| CN | 1844700 A | 10/2006 |
| CN | 103201538 A | 7/2013 |

(Continued)

OTHER PUBLICATIONS

Ronald A. Walsh, "Electromechanical Design Handbook" Powercon Corporation, Third Edition, 1999, pp. 1-67.

*Primary Examiner* — Josh Skroupa
(74) *Attorney, Agent, or Firm* — Quinn IP Law (57) ABSTRACT

A torque transfer mechanism includes an input member to receive an input torque from a propulsion source, and an output member coupled to the input member to transfer the input torque to a driveline component. A multi-component damping mechanism is disposed between the input member and the output member which includes a first spring element cooperating with a second spring element to couple the input member to the output member. The first spring element defines a greater stiffness and shorter deflection relative to the second spring element.

14 Claims, 4 Drawing Sheets

(56) References Cited

U.S. PATENT DOCUMENTS

| | | | |
|---|---|---|---|
| 4,781,653 A | | 11/1988 | Nakamura et al. |
| 4,782,936 A | * | 11/1988 | Bopp ................... F16F 15/1333 464/59 |
| 4,874,074 A | * | 10/1989 | Damon ............... F16F 15/1213 192/207 |
| 5,078,648 A | * | 1/1992 | Stretch ................ F16F 15/1213 464/58 |
| 5,078,649 A | * | 1/1992 | Leichliter ............ F16F 15/1213 464/58 |
| 5,085,617 A | * | 2/1992 | Stretch ................ F16F 15/1213 192/207 |
| 5,147,246 A | * | 9/1992 | Focqueur ............ F16F 15/1213 464/59 |
| 5,163,873 A | * | 11/1992 | Mason ................... F16D 27/105 464/59 |
| 5,226,514 A | * | 7/1993 | Chimner ............. F16F 15/1213 464/57 |
| 5,484,353 A | | 1/1996 | Lux et al. |
| 5,669,354 A | | 9/1997 | Morris |
| 9,005,037 B2 | * | 4/2015 | Sasse .................. F16F 15/1343 464/68.9 |

FOREIGN PATENT DOCUMENTS

| | | |
|---|---|---|
| CN | 103261745 A | 8/2013 |
| CN | 104334915 A | 2/2015 |
| CN | 101305218 A | 11/2018 |
| DE | 102011017651 A1 | 10/2012 |
| DE | 102016208261 A1 | 11/2017 |
| EP | 0744563 A2 | 11/1996 |

* cited by examiner

POWERTRAIN TORQUE TRANSFER DAMPING MECHANISM

TECHNICAL FIELD

The present disclosure relates to damping driveline disturbances while transferring torque.

INTRODUCTION

Engine torque perturbations which are not absorbed by a driveline device such as a torque converter may be passed directly through one or more torque couplings such as clutches to downstream portions of the driveline and vehicle structure. These torque perturbations may produce undesirable pulsations and/or fore-aft surging, commonly referred to as "chuggle." The usage of a torque coupling clutch may be restricted to certain limited vehicle operating conditions in effort to minimize some portion of these undesirable effects. However, it may be difficult to recognize via a conventional powertrain controller those particular vehicle operating conditions prone to these disturbances.

SUMMARY

A torque transfer mechanism includes an input member to receive an input torque from a propulsion source, and an output member coupled to the input member to transfer the input torque to a driveline component. A multi-component damping mechanism is disposed between the input member and the output member which includes a first spring element cooperating with a second spring element to couple the input member to the output member. The first spring element defines a greater stiffness and shorter deflection relative to the second spring element.

A torque transfer mechanism includes a rotatable input member to receive an input torque from a propulsion source. The torque transfer mechanism also includes a first member coupled to the input member to transfer torque and at least one elastic second member arranged to receive transferred torque from the first member. The torque transfer mechanism further includes an output member torsionally coupled to the elastic second member such that the output member is configured to transfer an output torque to a downstream element in a vehicle driveline. Actuation of the first member changes a resistive torque response of the elastic second member.

A torque transfer mechanism includes an input member to receive an input torque from a propulsion source and an output member coupled to the input member to transfer the input torque to a driveline component. The torque transfer mechanism also includes a multi-component damping mechanism arranged to restrict relative rotation between the input member and the output member. The multi-component damping mechanism also provides a first spring rate during a first portion of relative rotation and a second spring rate during a second portion of relative rotation.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In a number of variations a vehicle propulsion system may include a multi-speed transmission and driveline to transfer power to propel the vehicle. A propulsion source for example, such as a combustion engine or an electric motor, generates an input torque that is transferred through the driveline. In some variations, the propulsion system may include an additional propulsion source to selectably supplement a primary propulsion source. Related to the desired propulsion states based on operating conditions, torque from any of the available propulsion sources may be coupled or decoupled from the driveline of the vehicle. As one or more of the propulsion sources is engaged with the driveline, torque and speed perturbations also known as driveline "chuggle" may occur. As a result an undesirable surging or shudder may be noticed by vehicle passengers. At low automotive vehicle speeds, chuggle can occur when a torque coupling such as a locking clutch is engaged. The perceptible engine torque perturbations may operate to undermine confidence in vehicle and engine stability. Chuggle may be avoided in some cases by restricting the timing of clutch lockup to higher speeds, which can result in a sacrifice to engine fuel economy at lower speeds. According to aspects of the present disclosure, enhanced damping is used to compensate for chuggle so that torque coupling lockup may occur even at low vehicle speeds to improve engine fuel economy.

Figures 1, 2:
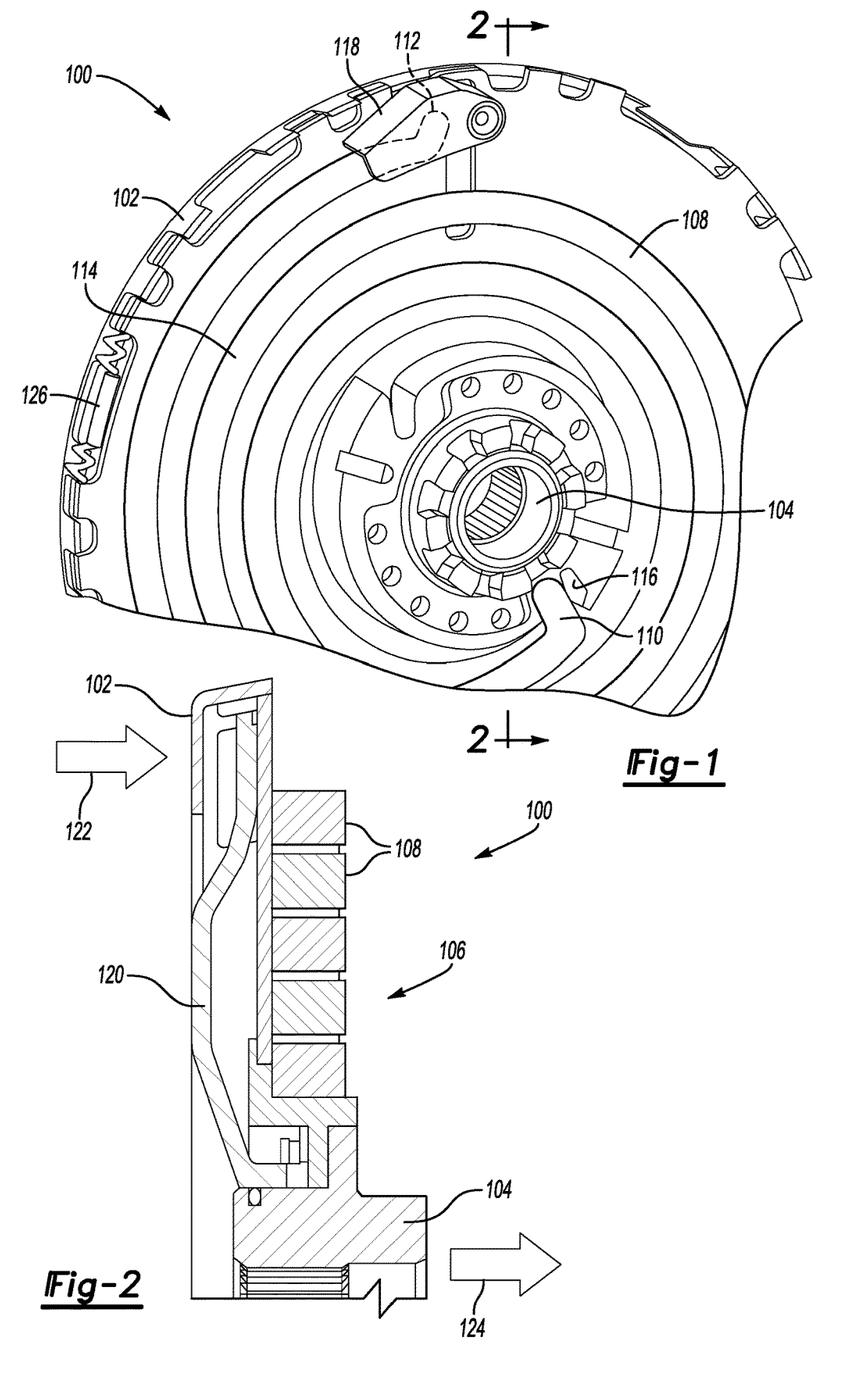
FIG. 1 is a partial perspective view of a torque transfer mechanism.
FIG. 2 is a cross section along line 2-2 through the torque transfer mechanism of FIG. 1.

Referring to FIG. 1, a torque transfer mechanism 100 allows for torque from an input member 102 to be transferred to an output member 104. The input member may receive input torque generated by one or more propulsion source (not shown). The output member 104 may pass the torque to other driveline components which are downstream in the torque flow of the propulsion system. In one example, the output member is coupled to an input shaft of a variable ratio transmission.

Figure 3:
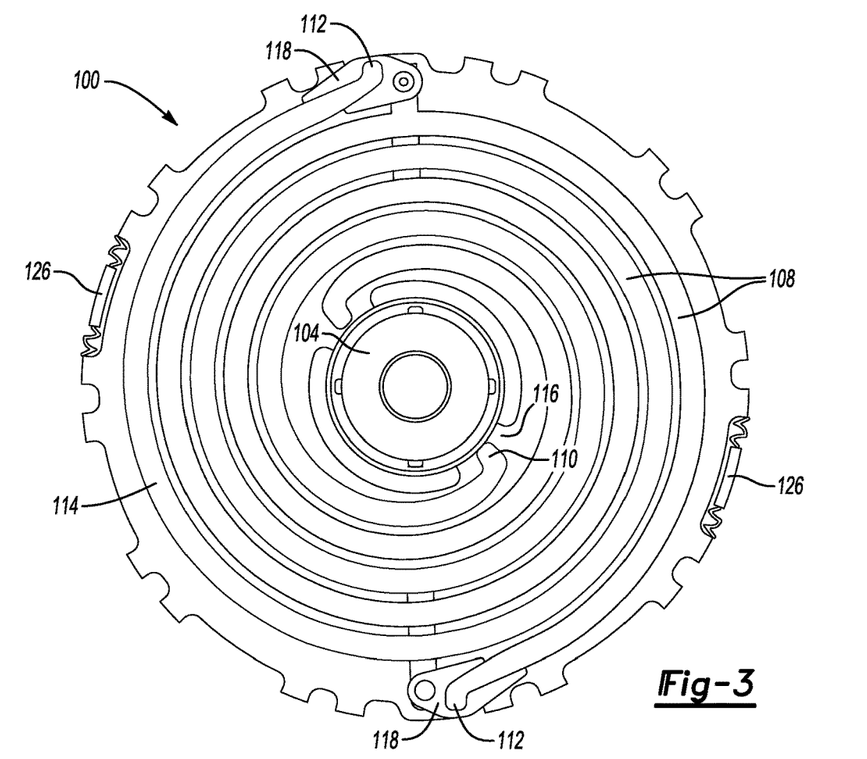
FIG. 3 is an end view of a portion of the torque transfer mechanism of FIG. 1.

The input member 102 may be selectively coupled to an output portion of the propulsion source to receive the input torque when so desired. A selectable-state torque coupling may allow the input member and the propulsion source to switch between a coupled state and a de-coupled state. The coupling may include a clutch, belt, gear, and/or other types of torque coupling. Related to the onset of a coupled state from a previously de-coupled state, torque surges may occur in the powertrain system due to the transitions between the different load cases. In certain variations the selectable state coupling may be part of a fluid coupling torque converter. In the torque converter example, there may be an additional rigid mechanical coupling between the torque input and the torque output to improve efficiency of torque transfer once the input and output achieve suitable relative speeds. More specifically, the torque converter may include a locking clutch that can be applied as the speed of a turbine output portion of the approaches the speed of an impeller input portion so that a fixed mechanical link is established between the input and output. A friction plate may be provided on a piston such that when actuated, the piston applies pressure between the friction plate and a housing so that the piston rotates with the housing. In the example of FIGS. 1 through 3, the input member 102 may be selectively coupled with a friction plate 120. Similarly, the output member 104 may be connected to an output portion of a driveline to pass torque downstream to propel the vehicle. Generally, the torque transfer mechanism 100 may be applied as the locking portion of a fluid coupling torque converter. Alternatively, the torque transfer mechanism may be a part of any selectable-state torque coupling device, including for example, a manual transmission clutch, a dual-clutch transmission, and a continuously variable transmission.

Torque transfer mechanism 100 includes one or more damping elements 106 disposed between the input member 102 and the output member 104 to absorb at least a portion of the input torque 122 as it is transformed into an output torque 124. It may be desirable to allow for extended rotational travel between the input member 102 relative to the output member 104. In one example, the damping elements 106 include at least one long-travel spring 108 which is provided to absorb a least a portion of the input torque 122 to help smooth transitions related to the onset of the coupled state. One or more long-travel springs 108 include an inner end 110, an outer end 112 and a length 114 extending in between the inner end 110 and the outer end 112. In a more specific example, the long-travel springs 108 are clock springs, where each of the springs 108 is wound in a spiral shape from the inner end 110 to the outer end 112. The length 114 may be disposed in a generally singular plane. The clock spring is connected to the input member 102 at the inner end 110, and connected to the output member 104 at the opposing outer end 112. The example clock spring may be formed from rolled metal strips wound into a coil. The springs 108 may alternatively be formed using any material capable of providing a substantially constant spring rate such as carbon fiber. The coil shape enhances the ability to store large amounts of energy for the available volume. The spring arrangement also provides a relatively low spring constant (k) and long extension capability (i.e., long-travel) relative to other types of damping elements. The term "long-travel" spring as used herein may characterize an extended rotation angle allowed by the spring having a relatively low spring constant. In some examples, the damping elements allow for a rotational deflection of at least about 90 degrees. It is contemplated that shorter rotational deflection ranges may still be considered as long-travel, such as for example, about 30 degrees.

Each long-travel spring 108 has a generally linear torque versus travel profile. The springs may be designed to improve transitions into a coupled state of the torque transfer mechanism 100 over an extended range of operating conditions. A coupled state may refer to a fully or partially locked torque input relative to torque output. More specifically, the low spring constant of the long-travel springs 108 helps to reduce roughness related to the onset of a coupled state from a previously de-coupled state.

Locking the input member relative to the output member at a low speed condition may provide fuel economy improvements since the lock-up occurs sooner and a locked coupling transfers torque efficiently with little or no losses compared to a fluid coupling. A reduction in stiffness with the lower spring rate means the long-travel springs 108 must operate with additional compression, or travel, to handle the same amount of torque. As discussed above, a clock spring type damper is arranged to provide a long travel of at least 90 degrees while providing low spring rates.

With additional reference to FIG. 1 and FIG. 3, the inner end 110 of the long-travel spring 108 is connected with an inner receiving feature 116 of the output member 104. The inner end 110 may be shaped to be retained within a shaped opening of the inner receiving feature 116. The outer end 112 may be connected with an outer receiving feature 118 disposed on the input member 102. The outer end 112 may also be shaped to correspond to an opening in the receiving feature 118. Alternative to formed features described above, the long-travel springs 108 may be connected through pins, welds, or other fastening techniques at each end, as well as include additional connections along the length 114 of the coils of the springs 108.

The torque transfer mechanism 100 may include a rigid coupling such as a friction element 120 which may provide an additional connection to efficiently transfer the input torque 122 into output torque 124. In operation, the friction element 120 is engaged with the input member 102 when a piston is moved to compress the friction plate 120 against a housing portion of the input member.

At least one additional low-travel spring 126 is provided to provide increased stiffness of the damping elements 106 at a predetermined low range of deflection. The low-travel springs 126 also provide a relatively low stroke compared to the long-travel springs 108. In one example, the low-travel springs 126 provide about 2 degrees of travel through a full stroke. As discussed in more detail below, once the low-travel springs have fully traveled the long-travel springs 108 operate to dampen under higher deflection and load conditions. In this way, more energy is absorbed during a first spring rate phase while still allowing for extended travel under higher loads during a second spring rate phase.

Figure 4:
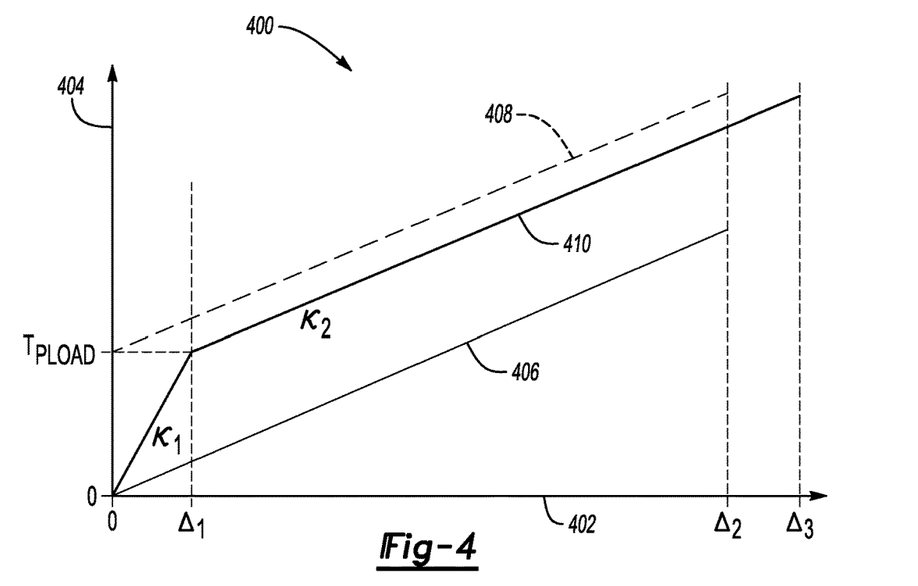
FIG. 4 is a plot of resistive force versus travel for damped torque transfer mechanisms.

Referring to FIG. 4, plot 400 indicates an example loading performance of a torque transfer mechanism having multiple-phase spring rate damping as discussed above. Horizontal axis 402 represents rotational travel of the input element relative to the output element of the torque transfer mechanism. The travel may correspond to deflection of the damping portion of the mechanism. Vertical axis 404 represents torque applied at the input member of the torque transfer mechanism. Curve 406 represents a loading profile for a long-travel clock spring having no preload. The spring corresponding to curve 406 begins to deflect immediately once torque is greater than zero, and may allow a total deflection of about $\Delta_2$. As discussed above, it may be advantageous to impart a preload in the damping portion of the system to increase torque resistance to dampen system disturbances. Curve 408 represents a load profile of a long-travel clock spring similar to that of curve 406 but configured to include a torque preload, $T_{PLOAD}$. As shown in the plot of FIG. 4, a spring having a preload according to curve 408 does not deflect under loads which are less than $T_{PLOAD}$. Therefore such a preloaded spring may be less effective at damping system torque disturbances at low loads (i.e., loads less than $T_{PLOAD}$). A single long-travel spring may be too compliant in the early stages of deflection and therefore allow undesirable slop in the torque transfer system which may cause a delay in torque delivery and be perceived by a driver as unresponsiveness or lag. Additionally, torque ripples may be created by abrupt changes in input and cause a perceptible torque surge or rebound. The clock spring may be arranged with preload value below which the spring will not actuate. In one example, the preload is about 50 Newton-meters.

As discussed above, a high stiffness, relatively short deflection (i.e., low-travel) first spring element cooperates with a preloaded, long-travel second spring element. In this case the first spring element helps to dampen low load torque disturbances, and the second spring element is effective to help dampen higher load torque disturbances at greater deflection values. According to one example, the first spring element is provided to deflect in response to input torque values greater than zero and have a maximum deflection amount of $\Delta_1$. Also, the first spring element is configured to reach the maximum deflection $\Delta_1$, or end of travel, corresponding to an input torque value equal to about the value of the torque preload, $T_{PLOAD}$ of the second spring element. During a first phase of rotational deflection between 0 and $\Delta_1$ (i.e., where torsional load is less than $T_{PLOAD}$) only the spring constant $\kappa_1$ of the first spring element is in effect. That is, the second spring element is provided with a preloaded torque value such that an input torque less than the preloaded torque value actuates only the first spring element. Therefore the first spring element reaches end of travel in response to an input torque value substantially less than a total input torque capable of being absorbed by the multi-component damping mechanism.

Once the first spring element reaches the end of travel corresponding to a full stroke, the second spring element having a spring constant $\kappa_2$ is engaged. The combination of the differently-configured elastic deformation elements operates to provide a damping mechanism having a multi-phase spring constant. Curve 410 represents a load profile for a combination of the first spring element and second spring element. The first spring extends with a resistive force corresponding to spring constant $\kappa_1$ and the second spring constant defines a more compliant spring constant $\kappa_2$. During a second phase of rotational travel between $\Delta_1$ and $\Delta_3$ (i.e., where torsional load is greater than $T_{PLOAD}$) only the spring constant $\kappa_2$ of the second spring element is in effect.

Figure 5A:
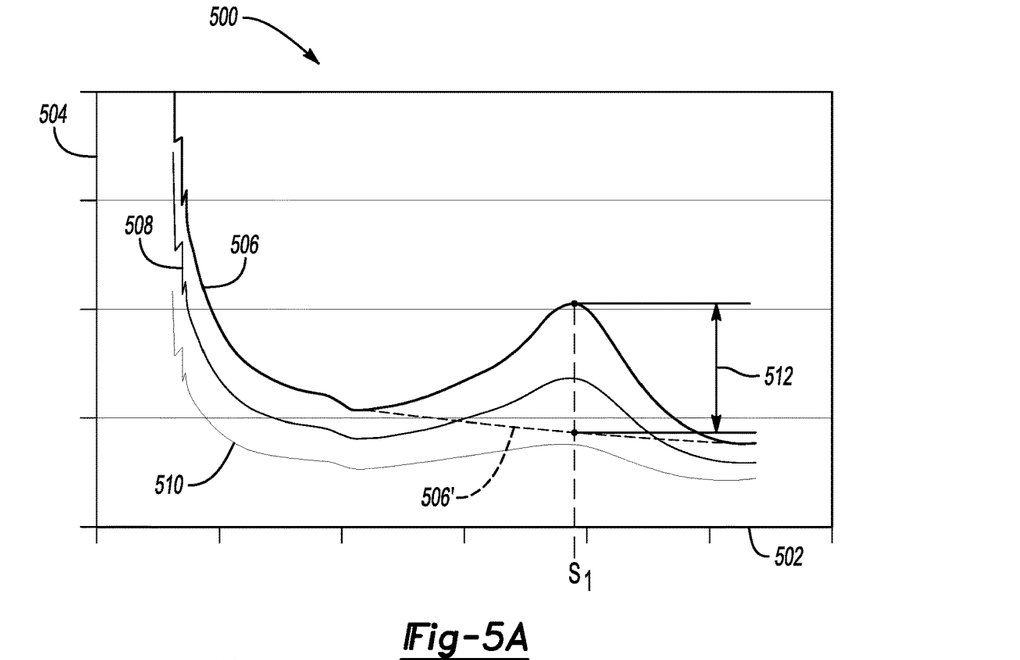
FIG. 5A is a plot of input speed versus output speed for a torque transfer mechanism having a single spring rate damping mechanism.

Referring to FIG. 5A, plot 500 depicts a comparison of relative input speed and output speed for a single rate clock spring damping mechanism across various input torque values. Horizontal axis 502 represents rotational output speed of the torque transfer mechanism, and vertical axis 504 represents rotational input speed into the torque transfer mechanism. Curve 506, curve 508, and curve 510 represent the onset of an engaged mode of torque transfer for input torques of 150 Newton-meters, 100 Newton-meters, and 50 Newton-meters, respectively. As the torque transfer mechanism is engaged, input speed is transferred through the mechanism to produce the output speed.

It may be preferable to limit or reduce torque disturbances which may arise during the transition between torque transfer modes. In the example of FIG. 5A corresponding to a single spring rate clock spring, a disturbance occurs at around output speed Si. Referring specifically to the load case of 150 Newton-meters corresponding to curve 506, a disturbance in the torque transfer manifests as a surge or unintended rebound of input velocity. A hypothetical ideal velocity transfer profile may be characterized by curve 506'. A magnitude 512 of the speed error or surge indicates the intensity of the chuggle event which may be perceived by a driver as roughness. While the load case of 150 Newton-meters is discussed by way of example, it should be appreciated that the 100 Newton-meter load case of curve 508, and the 50 Newton-meter load case of curve 510 also exhibit speed protuberances or chuggle during the transition in torque delivery.

Figure 5B:
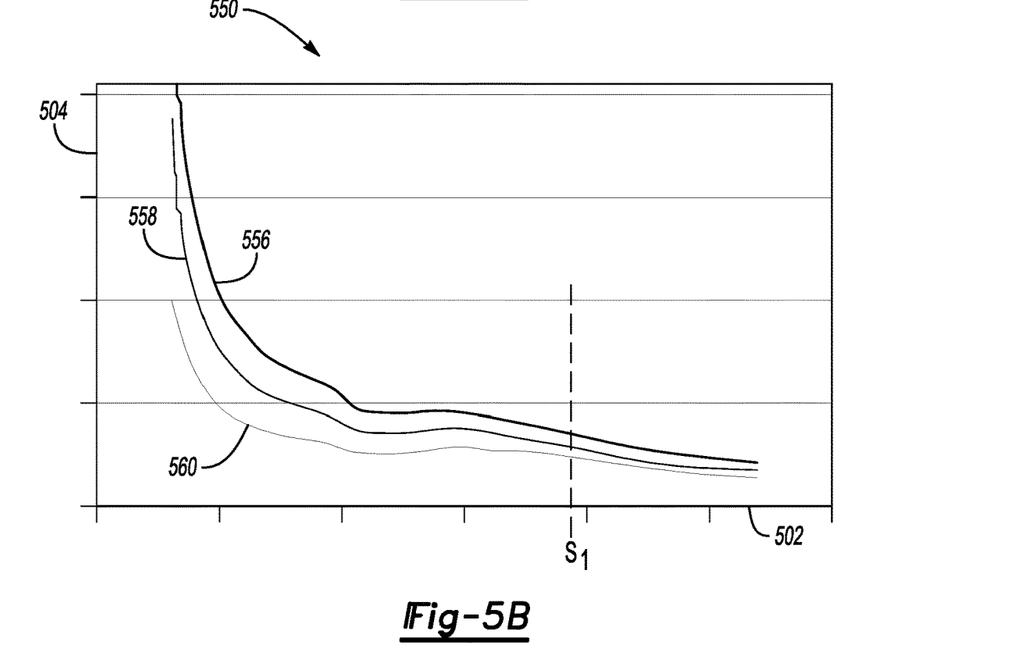
FIG. 5B is a plot of input speed versus output speed for a torque transfer mechanism having a multi-phase spring rate damping mechanism.

Referring to FIG. 5B, plot 550 depicts relative input speed and output speed for a multiple rate clock spring and stiffening spring combination mechanism as described above. Curve 556, curve 558, and curve 560 represent the onset of an engaged mode of torque transfer for each of 150 Newton-meters, 100 Newton-meters, and 50 Newton-meters, respectively. However in the multiple rate transfer mechanism of plot 550, speed disturbances related to the torque mode change are substantially eliminated. Through the foregoing variations, a damper mechanism having multiple phase spring constants may enable a torque converter clutch to lock up in a vehicle under low speed and all firing fractions of the vehicle's engine, with efficient cost and mass.

Figure 6:
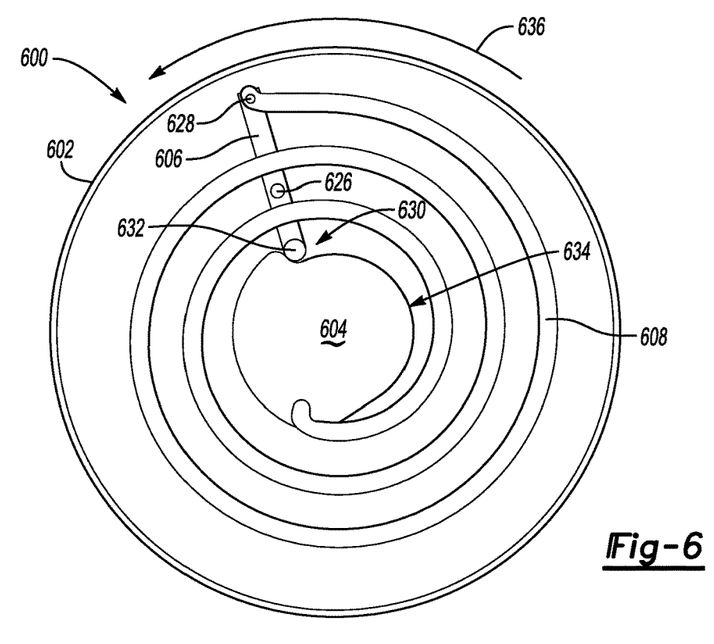
FIG. 6 is a schematic end view of an alternate example torque transfer mechanism.

Referring to FIG. 6, another example torque transfer mechanism 600 provides multiple phase spring rate damping based on the rotational travel of the input relative to the output. A cam-lever mechanism is provided to cooperate with a spring element 608. In the example of FIG. 6, the spring element 608 is a long-travel clock spring. Torque is transferred between an input member 602 and an output member 604. A cam lever 606 is pivotably attached to the input member 602 at pivot pin 626. A first end 628 of the cam lever 606 is pivotally connected to the spring element 608. An opposing second end 630 of the cam lever includes a roller 632 that is biased to roll against an outer profile 634 of the output member 604. The input member rotates providing an input torque along a direction indicated by arrow 636. As the input member 602 rotates, the pivot pin 626 moves in the direction of rotation. A resistive force is generated at the first end 628 from the spring element 608.

As the roller 632 traverses the outer surface, an attack angle of the cam lever 606 against the outer profile 634 changes. Based upon the orientation of the cam lever 606, the normal force of the roller upon the outer profile 634 of the output member 604 changes magnitude. The force upon the output member in turn varies the resistive torque between the input member 602 and the output member 604. The combination of the cam lever with a long-travel clock spring element generates a variable torque resistance to relative movement between the input and the output. Based on an outer profile shape of the cam portion, the load upon the roller varies based on the relative torque displacement thereby causing the resistive torque to change as the input member is rotated relative the output member. According to one example, the shape of the outer profile 634 is configured to cause a first spring rate during an initial phase of travel, and a second spring rate during a subsequent phase of travel.

According to further examples, the cam outer profile causes a predetermined torque resistance profile to resist relative rotation between the input member and the output member during torque coupling state changes.

Figure 7:
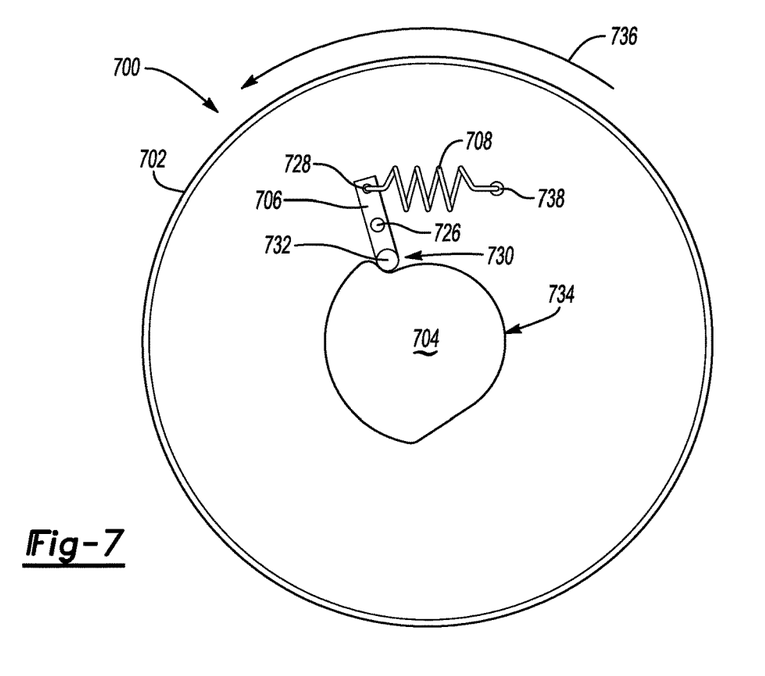
FIG. 7 is a schematic end view of a further example torque transfer mechanism.

Referring to FIG. 7, a further example torque transfer mechanism 700 provides multiple spring rates for damping based on the rotational travel of the input member relative to the output member. A cam-lever mechanism is provided in addition to a linear coil spring. Torque is transferred between an input member 702 and an output member 704. A cam lever 706 is pivotably attached to the input member 702 at a first pivot pin 726. A first end 728 of the cam lever 706 is pivotally connected to the spring element 708. The spring element 708 may be a constant rate spring having a relatively linear force-deflection profile. In certain alternate examples, the spring element 708 may be a multi-rate spring having two or more separate linear spring rates which apply based on the amount of deflection of the spring element. Further examples may provide spring element 708 as a continuously variable spring rate which progressively changes spring rate as a function of the deflection of the spring. A distal end of the spring element 708 is connected to a second pivot pin 738 that is coupled to the input member 702.

An opposing second end 730 of the cam lever 706 includes a roller 732 that is biased to roll against an outer profile 734 of the output member 704. The input member rotates along a direction indicated by arrow 736. As the input member 702 rotates, the first pivot pin 726 and the second pivot pin 738 move in the direction of rotation. A resistive force is generated at the first end 728 from the spring element 708 and causes a resistive torque of opposing relative rotation of the input member 702. The resistive torque of the torque transfer mechanism is varied as As the roller 732 traverses the outer surface an attack angle of the cam lever 706 against the outer profile 734 changes. Based upon the orientation of the cam lever 706, the normal force of the roller upon the outer profile 734 of the output member 704 changes magnitude. The force upon the output member 704 in turn varies the resistive torque between the input member 702 and the output member 704. The combination of the cam lever with clock spring type of torsion spring generates a variable torque resistance to relative movement between the input and the output. Based on an outer profile shape of the cam portion, the load upon the roller varies based on the relative torque displacement thereby causing the resistive torque to change as the input member is rotated relative the output member. According to one example, the shape of the outer profile 734 is configured to cause a first spring rate during an initial phase of travel, and a second spring rate during a subsequent phase of travel.

While the examples provided in FIG. 6 and FIG. 7 provide variations of a cam-lever mechanism combined with a spring element, it is contemplated that other mechanism combinations are within the scope of the present disclosure. For example, a four-bar mechanism in combination with a spring element having a predetermined spring constant may provide a suitable multiple phase spring rate to inhibit chuggle related to transitions in torque delivery. In another example a pivoting lever having a sliding element may be combined with a spring element such that a pivoting actuation of the pivot lever changes a spring rate of the spring element during actuation. Also, bushings or other compliant elastic members may be employed. In general, a combination providing a high stiffness damping during low travel and a reduced stiffness damping over extended travel may enhance transitions in torque delivery.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A torque transfer mechanism comprising:
   an input member to receive an input torque from a propulsion source;
   an output member coupled to the input member to transfer the input torque to a driveline component;
   a multi-component damping mechanism disposed between the input member and the output member including a first spring element cooperating with a second spring element to couple the input member to the output member;
   wherein the first spring element is configured to provide a first spring rate during a first portion of relative rotation when the input torque is below a preloaded torque value, the first spring element reaching an end of travel when the input torque is approximately equal to the preloaded torque value;
   wherein the second spring element is configured to provide a second spring rate during a second portion of the relative rotation when the input torque is above the preloaded torque value; and
   wherein the first spring rate is greater than the second spring rate and the second portion of the relative rotation is greater than the first portion.

2. The torque transfer mechanism of claim 1, wherein:
   the output member includes an inner receiving feature and an outer receiving feature each having respective openings;
   the second spring element defines an inner end configured to fit into and shaped to correspond with the respective opening in the inner receiving feature; and
   the second spring element defines an outer end configured to fit into and shaped to correspond with the respective opening in the outer receiving feature.

3. The torque transfer mechanism of claim 1, wherein:
   the first portion of the relative rotation is about 2 degrees; and
   the second portion of the relative rotation is at least about 90 degrees.

4. The torque transfer mechanism of claim 1 wherein the first spring element reaches an end of travel in response to an input torque value substantially less than a total input torque capable of being absorbed by the multi-component damping mechanism.

5. The torque transfer mechanism of claim 1, wherein the second spring element is a single clock spring torsionally coupling the input member to the output member.

6. The torque transfer mechanism of claim 1 further comprising a selectably engageable locking clutch to rigidly couple the input member to the output member.

7. A torque transfer mechanism comprising:
a rotatable input member to receive an input torque from a propulsion source;
a first spring element coupled to the input member to transfer torque;
a second spring element arranged to receive transferred torque from the first spring element;
an output member torsionally coupled to the second spring element, the output member configured to transfer an output torque to a downstream element in a vehicle powertrain, wherein actuation of the first spring element changes a resistive torque response of the second spring element;
wherein the first spring element is configured to provide a first spring rate during a first portion of relative rotation between the input member and the output member when the input torque is below a preloaded torque value, the first spring element reaching an end of travel when the input torque is approximately equal to the preloaded torque value;
wherein the second spring element is configured to provide a second spring rate during a second portion of the relative rotation when the input torque is above the preloaded torque value; and
wherein the first spring rate is greater than the second spring rate and the second portion of the relative rotation is greater than the first portion.

8. The torque transfer mechanism of claim 7 wherein the second spring element is a single clock spring torsionally coupling the input member to the output member.

9. The torque transfer mechanism of claim 7, wherein:
the output member includes an inner receiving feature and an outer receiving feature each having respective openings;
the second spring element defines an inner end configured to fit into and shaped to correspond with the respective opening in the inner receiving feature; and
the second spring element defines an outer end configured to fit into and shaped to correspond with the respective opening in the outer receiving feature.

10. The torque transfer mechanism of claim 7, wherein:
the first portion of the relative rotation is about 2 degrees; and
the second portion of the relative rotation is at least about 90 degrees.

11. A torque transfer mechanism comprising:
an input member to receive an input torque from a propulsion source;
an output member coupled to the input member to transfer the input torque to a driveline component;
a multi-component damping mechanism arranged to restrict relative rotation between the input member and the output member, including a first spring element and a second spring element;
wherein the first spring element is configured to provide a first spring rate during a first portion of relative rotation between the input member and the output member when the input torque is below a preloaded torque value and the second spring element is configured to provide a second spring rate during a second portion of the relative rotation when the input torque is above the preloaded torque value;
wherein the first spring rate is greater than the second spring rate and the second portion of the relative rotation is greater than the first portion;
wherein the output member includes an inner receiving feature and an outer receiving feature each having respective openings;
wherein the second spring element defines an inner end configured to fit into and shaped to correspond with the respective opening in the inner receiving feature; and
wherein the second spring element defines an outer end configured to fit into and shaped to correspond with the respective opening in the outer receiving feature.

12. The torque transfer mechanism of claim 11 wherein:
the first spring element is configured to fully actuate an input torque value corresponding to a preload of the second spring.

13. The torque transfer mechanism of claim 11, wherein:
the first portion of the relative rotation is about 2 degrees; and
the second portion of the relative rotation is at least about 90 degrees.

14. The torque transfer mechanism of claim 11, wherein the second spring element is a single clock spring torsionally coupling the input member to the output member.

* * * * *